(12) United States Patent
Beaufils

(10) Patent No.: US 9,109,688 B2
(45) Date of Patent: Aug. 18, 2015

(54) DEVICE FOR CONTROLLING A GEARBOX AND A PARKING BRAKE OF A MOTOR VEHICLE, USING A COMMON OPERATING LEVER

(75) Inventor: Dominique Beaufils, St-Fargeau-Ponthierry (FR)

(73) Assignee: DURA AUTOMOTIVE SYSTEMS SAS (FR)

( * ) Notice: Subject to any disclaimer, the term of this patent is extended or adjusted under 35 U.S.C. 154(b) by 0 days.

(21) Appl. No.: 14/131,621

(22) PCT Filed: Jul. 4, 2012

(86) PCT No.: PCT/FR2012/051566
§ 371 (c)(1),
(2), (4) Date: Mar. 5, 2014

(87) PCT Pub. No.: WO2013/007924
PCT Pub. Date: Jan. 17, 2013

(65) Prior Publication Data
US 2014/0224056 A1 Aug. 14, 2014

(30) Foreign Application Priority Data

Jul. 8, 2011 (FR) .................................... 11 56204

(51) Int. Cl.
*B60W 10/18* (2012.01)
*F16H 59/02* (2006.01)
*B60T 7/10* (2006.01)
*G05G 1/04* (2006.01)
*F16H 59/04* (2006.01)
*F16H 61/36* (2006.01)

(52) U.S. Cl.
CPC ............ *F16H 59/0278* (2013.01); *B60T 7/102* (2013.01); *F16H 59/042* (2013.01); *G05G 1/04* (2013.01); *F16H 61/36* (2013.01); *F16H 2059/0282* (2013.01); *Y10T 74/20073* (2015.01)

(58) Field of Classification Search
USPC ...................................... 192/219.4; 74/473.19
See application file for complete search history.

(56) References Cited

U.S. PATENT DOCUMENTS 1,908,907 A   5/1933   Lessler
3,974,711 A * 8/1976   Hurst et al. ................. 74/473.22
3,987,879 A  10/1976   Longshore et al.
(Continued)

FOREIGN PATENT DOCUMENTS

DE   729325 C   12/1942
DE   4035390 A1   5/1991
(Continued)

OTHER PUBLICATIONS

International Search Report Application No. PCT/FR2012/051566 Completed: Feb. 18, 2013; Mailing Date: Feb. 27, 2013 3 pages.

*Primary Examiner* — David J Hlavka
(74) *Attorney, Agent, or Firm* — St. Onge Steward Johnston & Reens LLC

(57) ABSTRACT

A lever having a trigger that is retractable against a travel limiter for engagement of the reverse gear; the lever is interlocked with a means for being switched from one position, allowing the engagement and selection of gears, to another position for applying the parking brake, with the possibility of selecting and engaging a gear; the lever base has a spherical body equipped with a multi-directional movement capability in a mounting, while being equipped for the engagement and selection of gears.

10 Claims, 5 Drawing Sheets

(56) References Cited

U.S. PATENT DOCUMENTS

| | | | |
|---|---|---|---|
| 4,569,245 A * | 2/1986 | Feldt et al. | 74/473.34 |
| 4,914,969 A * | 4/1990 | Lieb | 74/473.23 |
| 5,706,703 A | 1/1998 | Kim | |
| 6,662,924 B2 * | 12/2003 | Giefer et al. | 192/220.7 |
| 7,334,497 B2 * | 2/2008 | Giefer et al. | 74/473.12 |
| 8,127,638 B2 * | 3/2012 | Kumagai et al. | 74/473.35 |
| 8,327,732 B2 * | 12/2012 | Giefer et al. | 74/473.23 |
| 2007/0234837 A1 | 10/2007 | Russell | |

FOREIGN PATENT DOCUMENTS

| | | |
|---|---|---|
| DE | 102009057953 A1 | 6/2011 |
| EP | 0209431 A1 | 1/1987 |
| EP | 0706922 A1 | 4/1996 |
| EP | 0978671 A1 | 2/2000 |
| EP | 2163793 A1 | 3/2010 |
| FR | 2895957 A1 | 7/2007 |

\* cited by examiner

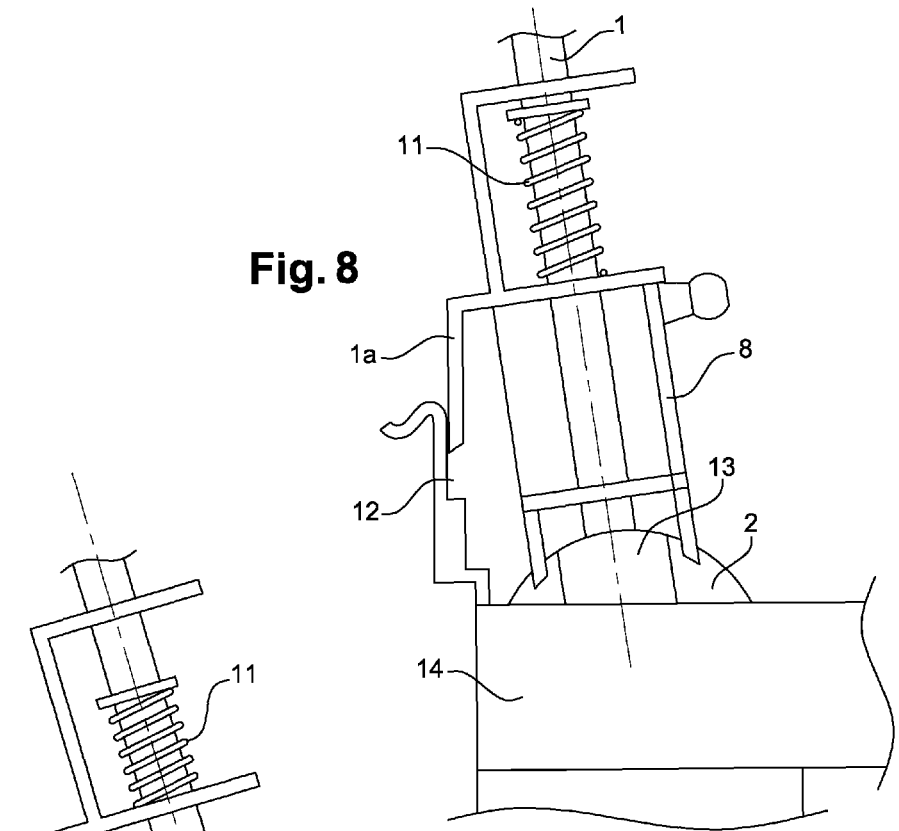
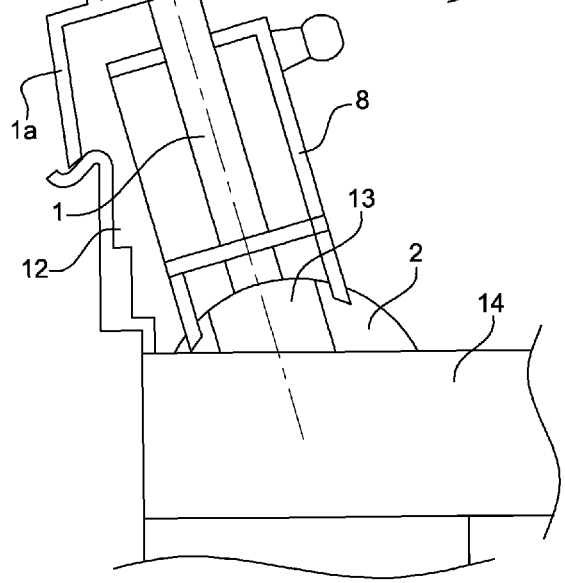

DEVICE FOR CONTROLLING A GEARBOX AND A PARKING BRAKE OF A MOTOR VEHICLE, USING A COMMON OPERATING LEVER

FIELD OF THE INVENTION

The invention pertains to the technical field of equipment for motor vehicles, and more-particularly concerns a device for controlling a gearbox and a parking brake by means of the same control lever.

BACKGROUND OF THE INVENTION

Generally, a motor vehicle has, in separate form, one control lever for the selection and engagement of gears and one lever—usually acting on a cable—to operate a parking brake. The gear lever is mounted with multi-directional movement ability by means of a ball-and-socket joint, in a mounting secured to the floor or dashboard of the vehicle. The bottom end of the lever, which is referred to as the "lever base" is equipped to be coupled to gear engagement and selection devices.

It has also been proposed to implement these two functions, i.e. firstly, the engagement and selection of gears and, secondly, the operation of the parking brake, using the same control lever. A solution of this type can be found in patent EP 2163793, of which the applicant for this patent herein is also the holder.

The technical solution described in this patent is satisfactory, but is limited to vehicles that are not equipped with a reverse gear locking system, for example, by means of a retractable trigger-type release interoperating with a travel limiter. According to this invention, quite the contrary, a trigger mounted on the control lever is used to implement the parking brake control function. It is also observed that, during the engagement of the parking brake function, it is no longer possible to execute the function of selecting and engaging a gear. Note also that the various movements that it necessary to apply to the lever are not ergonomically satisfactory.

The invention is intended to remedy these disadvantages in a simple, sure, effective and rational manner.

SUMMARY OF THE INVENTION

The problem that the invention is designed to resolve is to be able to use the same control lever to execute both the function of engaging and selecting gears and the function of applying the parking brake, advantageously if the lever is equipped with a reverse gear locking trigger.

To resolve such a problem, a device for controlling a gearbox and a parking brake by means of a common control lever, in a known manner, has been designed and developed, the said lever having a trigger that is retractable against a travel limiter for engagement of the reverse gear; the lever is interlocked with a means for being switched from one position, allowing the engagement and selection of gears, to another position for applying the parking brake, with the possibility of selecting and engaging a gear; the lever base has a spherical body equipped with a multi-directional movement capability in a mounting, while being equipped for the engagement and selection of speeds.

According to the invention, given the problem to be resolved, the spherical body has, at its midpoint position, a disc mounted to rotate freely in a vertical plane, and traversed by the end of the lever, with the ability to slide against an elastic component; the said end has a temporary coupling device between the disc and the spherical body; the said device is able to interoperate, through force of pressure exerted on the lever, with a carriage controlled by a cable associated with the parking brake; the said carriage is movable in the mounting in which the spherical body is mounted, so as to cause—under an effect of angular movement of the lever—a movement of the said carriage and the said mounting, to exert a traction force on the cable; the angular movement of the said mounting engages a system of teeth with a retractable ratchet, in order to block the traction force on the cable, with the lever being returned to the position of coupling of the disc and the body via the elastic component, to allow the possible engagement of a gear.

The result of these arrangements, therefore, is that it is possible to conserve the reverse gear locking trigger with, in addition, the possibility, in the position of the parking brake being applied, of engaging a gear—first gear, for example, or the reverse gear, to facilitate a hill start, for instance.

To resolve the problem posed of being able to use the control lever either for controlling the selection and engagement of gears or for controlling the parking brake, the temporary coupling device between the disc and the spherical body is composed of a hemispherical base having a circular flat span able to interoperate with a complementary imprint in the disc and a spherical body; the said base has a rod for coupling with the carriage.

To resolve the problem posed of ensuring the movement of the carriage in view of exerting a traction force on the cable, the carriage is mounted with a capability for angular movement in two arc-shaped openings in the thickness of lateral flanges of the mounting, which is basically shell-shaped.

To resolve the problem posed of exerting a force on the control lever that is greater for applying the parking brake than for the movement necessary for engaging and selecting a gear, the carriage is connected to a return spring in parking brake cable traction position.

According to another characteristic, to ensure the blockage of the parking brake cable in the traction position, the teeth system consists of a toothed gate protruding from the base of one of the mounting's flanges.

According to other characteristics, the lever base is mounted able to pivot within a plate in combination with coupling parts connected to the gear selection and engagement cables.

The carriage return spring is coupled to the plate.

The reverse gear travel limiter protrudes from the plate, in order to interoperate with the lever's trigger, which can be retracted against an elastic component to escape the said travel limiter, corresponding to engagement of the reverse gear under an effect of angular tipping of the said lever.

To resolve the problem posed of releasing the parking brake, the ratchet is subjected to means so as to be retracted and returned to the position of interoperation with the toothed gate of the mounting.

In another form of implementation, the end of the lever is mounted with a capability for guided sliding within an open hole positioned vertically within the thickness of the disc, being returned to the coupling position by a spring mounted in a coaxial recess of the said hole.

BRIEF DESCRIPTION OF THE DRAWINGS

The invention will be explained below in more detail, with the aid of the appended drawings, in which:

FIG. 8 is a schematic view showing the positioning of the lever in the reverse gear locking position, for the engagement of the gears 1 and 2, for example;

FIG. 9 is a view corresponding to FIG. 8, showing the locking of the reverse gear escaping the travel limiter.

DETAILED DESCRIPTION OF THE INVENTION

Figure 1:
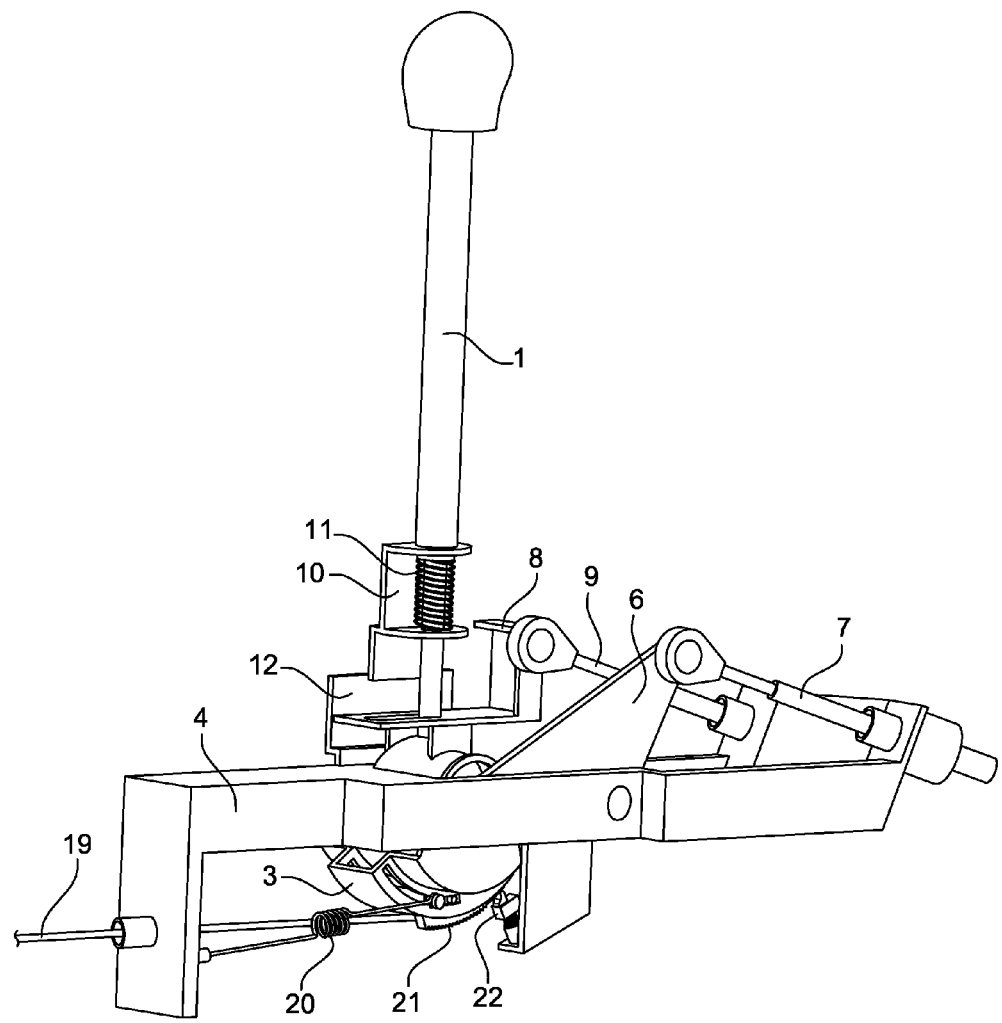
FIG. 1 is a schematic view in perspective showing one example of mounting of the control lever for controlling the engagement and selection of gears and operation of the parking brake, in accordance with the characteristics of the invention.

The device according to the invention is positioned as from a control lever (1) commonly used for the engagement and selection of gears, in the case of a manual gearbox. The lever base has a spherical body (2) installed in a mounting (3) articulated on a plate (4) that is integral with a part of the vehicle's chassis, for example.

The spherical body (2) has a coupling rod (5) basically perpendicular to the lever (1), for the mounting of a gear selection and relay component (6) controlled by, for example, a cable or a control rod (7). The lever (1) interoperates with a component (8) connected to a cable (9) for the engagement of selected gears. These various arrangements are not described in detail because they are perfectly familiar to an appropriately-knowledgeable professional, and can be implemented in various ways.

Similarly, the lever (1) is equipped with a trigger (10) mounted connected to a spring (11) implementing the reverse gear locking function in a manner perfectly familiar to an appropriately-knowledgeable professional. This trigger (11) interacts with a travel limiter (12) on the plate (4). As shown in FIGS. 8 and 9, for the selection of gears (1 and 2), for example, the trigger (10) is in travel limitation position with the component (12)—see FIG. 8—whereas, for the engagement of reverse gear, the trigger (10) is retracted upwards, for example, so as to escape the travel limiter (12) for the selection of reverse gear; see FIG. 9.

It is as from this type of device incorporating a lever (1) equipped with a reverse gear locking trigger that the said lever incorporates—notably at its extremity constituting the lever base—various means and installations capable of enabling, under the effect of certain movements of the said lever, either gear selection and engagement or operation of the parking brake with, when the parking brake is applied, the possibility of engaging at least one gear (generally first or reverse gear).

According to the invention, the spherical body (2), which constitutes a ball-and-socket joint, for a multi-directional movement of the lever (1), incorporates, at its midpoint position, a disc (13) mounted so as to rotate freely in a vertical plane. In other words, the axis of rotation of the disc (13) is positioned orthogonally to the axis of the lever (1). The lower extremity of the lever (1) is engaged to slide freely within the thickness of the disc (13) connected to an elastic component (14) such as, for example, a spring. In one form of implementation, the end of the lever (1) is mounted with a capability for guided sliding within an open hole positioned vertically within the thickness of the disc (13), being returned to position by the spring (14) mounted in a coaxial recess of the said hole.

An important feature is that the free end of the lever (1) has a temporary coupling device (15) between the disc (13) and the spherical body (2). As shown in the Figures, the coupling device (15) is composed of a hemispherical base (15) with a circular flat span (15a) able to interoperate with a complementary imprint or cavity (16) on the disc (13) and the spherical body (2). When no pressing force is exerted on the lever (1), the hemispherical base (15) is returned to position by the spring (14) so as to be positioned within the imprint (16). In this position of coupling of the disc (13) and the spherical body (2), an angular movement of the lever (1) in whatever direction causes, concomitantly, the movement of the spherical body (2)/disc (13) assembly for, for instance, the selection and engagement of gears, in a conventional manner.

According to another important characteristic of the invention, the temporary coupling device (15) has a transversal rod (17) able to interoperate, in the coupling position, with a moving carriage (18). The carriage (18) is mounted with an angular movement capability in two arc-shaped openings (3a) and (3b) existing in the thickness of lateral flanges (3c) and (3d) on the mounting (3), which is basically shell-shaped. The carriage (18) is coupled to a cable (19) associated with the parking brake. A spring (20) coupled between the carriage (18) and a part of the plate (4) returns the said carriage to position, as will be explained further on in the description.

In the coupling position of the interior extremity of the lever (1) in the carriage (18) by means of the rod (17), an angular movement of the said lever causes the movement of the carriage (18) and the mounting (3a), which consequently exerts a traction force on the cable (19).

The angular movement of the mounting (3) has the effect of engaging a teeth system (21) with a retractable ratchet (22), in order to block the traction force on the cable (19). This teeth system (21) is composed, for example, of a toothed gate protruding from the base of one of the flanges of the mounting (3).

Figure 2:
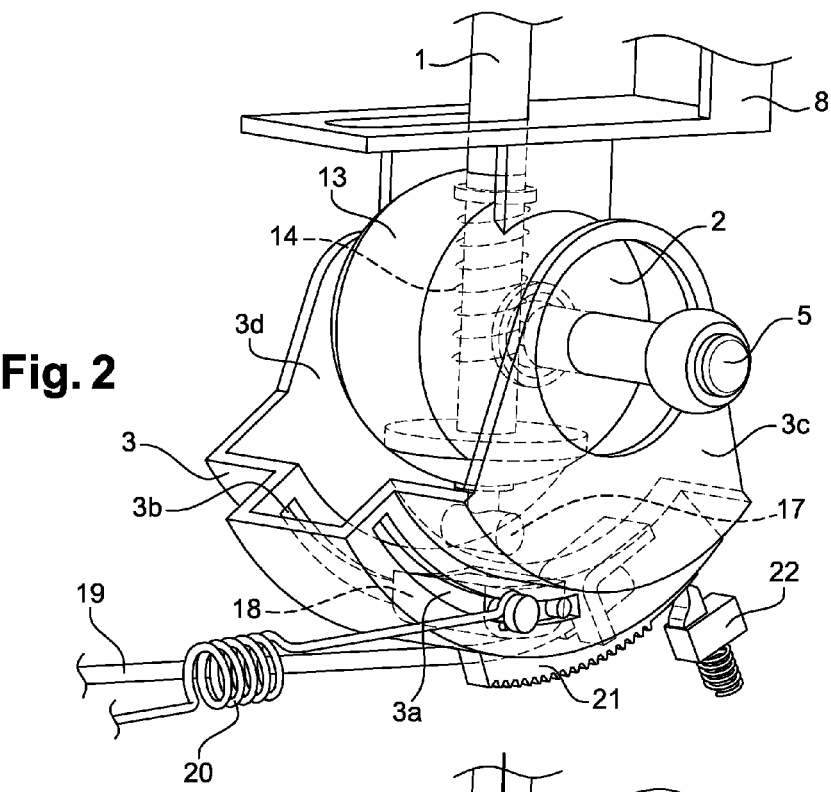
FIG. 2 is a perspective view looking notably at the level of the lever base, which is illustrated in the position for gear engagement and selection.
Figure 3:
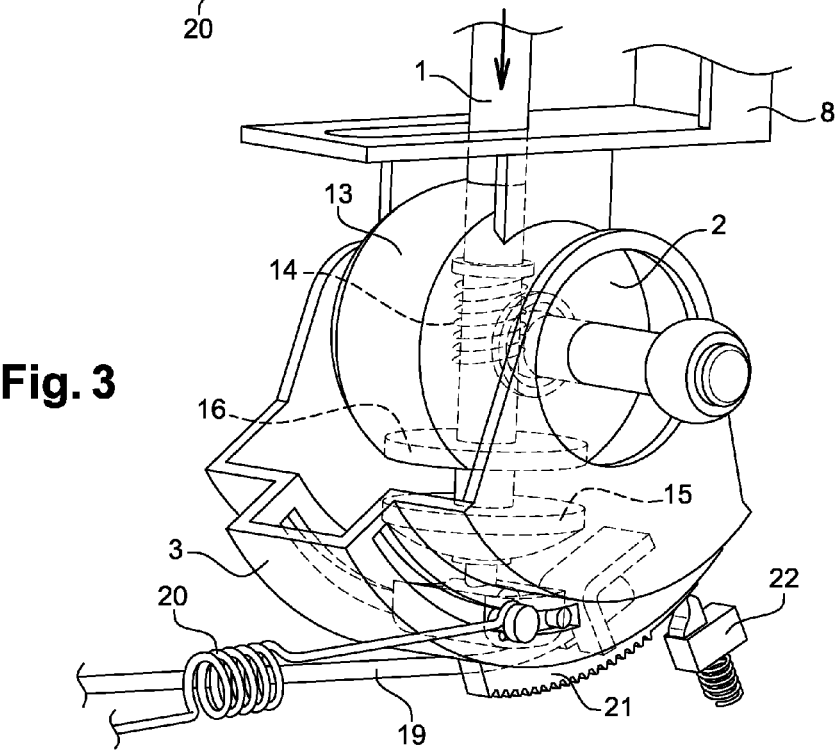
FIG. 3 is a view corresponding to FIG. 2, showing a pressing action exerted on the lever to uncouple it from the spherical body and to couple it with the parking brake control carriage.

One should analyze the positioning of the device referenced in FIGS. 2 to 7; notably:

In FIG. 2, the device is illustrated in the lever (1) position for the engagement and selection of gears; because the parking brake is not applied, no traction force is exerted on the cable (19). In this position, the disc (13) and the spherical body (2) are coupled by the device (15) housed in the imprints (16) of the spherical body assembly (2-13). Consequently, the lever (1) can be subjected to different angular movements for the selection and engagement of gears, considering that the coupling of the body (2) and the disc (13) acts as a ball-and-socket joint. In this position, the rod (17) is not coupled to the carriage (18). The lever (4) is maintained in this coupling position under the effect of relief of the spring (14).

When hand pressure, notably vertical, is exerted on the lever (1), the spring (14) is compressed and the coupling device (15) exits from the imprints (16). The rod (17) engages in a complementary imprint on the carriage (18); see FIG. 3.

Figure 4:
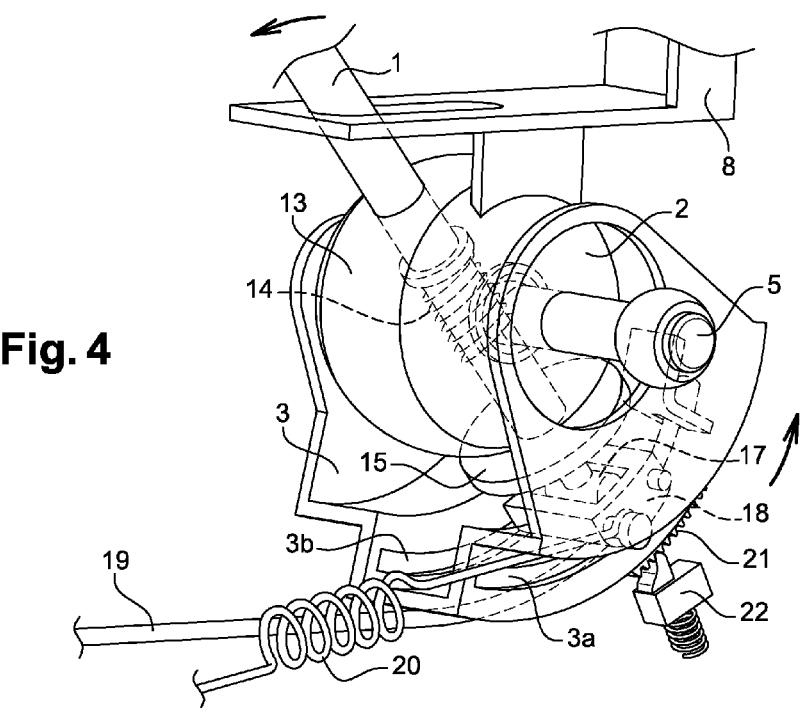
FIG. 4 is a view corresponding to FIG. 3, showing the tipping of the lever for the movement of the carriage and the mounting, in view of exerting a traction force on the parking brake cable and engaging the teeth system with the ratchet.

In this position of uncoupling of the disc (13) and the body (2) and of coupling of the said disc with the carriage (18), an angular movement of the lever (1) causes, concomitantly, the angular movement of the carriage (18) and the angular pivoting of the mounting (3); see FIG. 4.

In this position, under the effect of angular movement of the carriage and the mounting (3), the cable (19) of the parking brake is subjected to an attraction force corresponding to operation of the said brake.

Still in this position, the toothed gate (21) engages with the ratchet (22), in order to maintain this position of traction on the brake cable (FIG. 4). The spring (20) is also subjected to a traction force.

Figure 5:
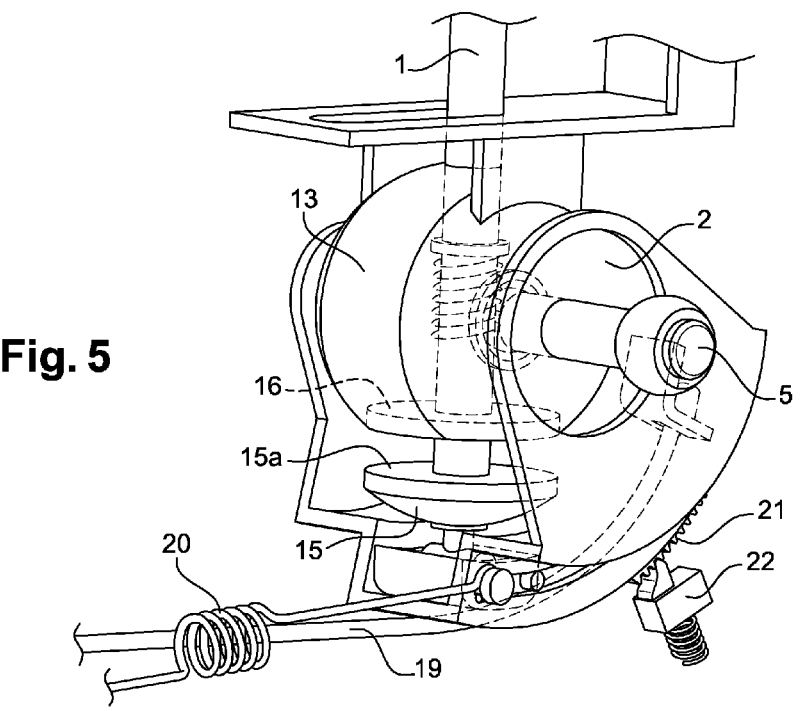
FIG. 5 is a perspective view corresponding to FIG. 4 after release of the tipping force exerted on the lever, which automatically returns in position; the parking brake cable is always under tension.

When one releases the lever (1), the spring (20) automatically returns the carriage (18) to the initial position in alignment of the coupling device (15) with the imprints (16); see FIG. 5.

Figure 6:
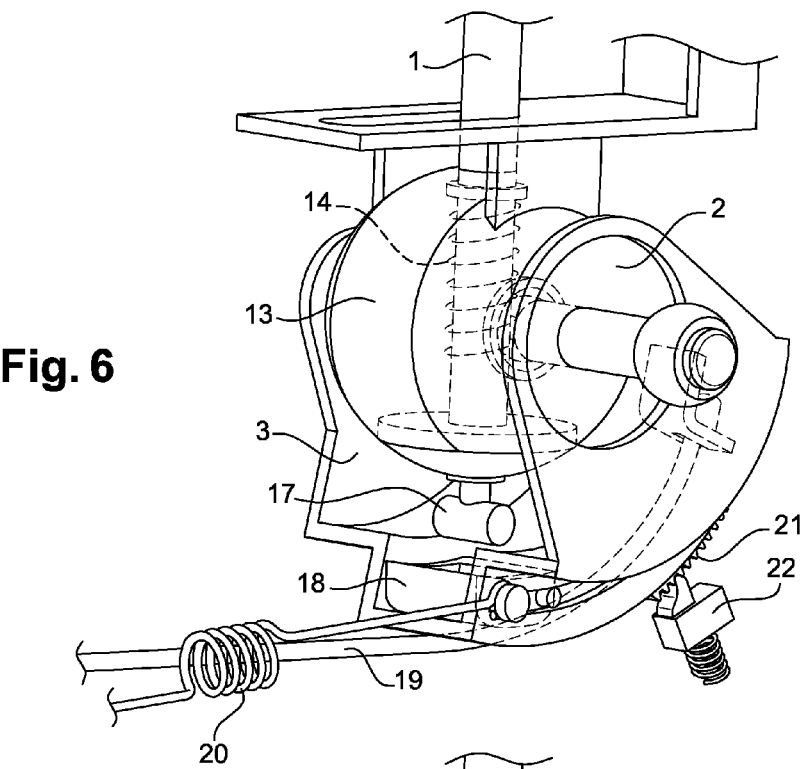
FIG. 6 shows the release of the pressure exerted on the lever so as to release the carriage and to ensure the coupling of the lever at the spherical body, to enable the possible engagement of a gear in the parking brake application position.

By releasing the pressing force exerted on the lever (1), the spring (14) automatically returns the said lever to the position of coupling the device (15) with the imprint (16); see FIG. 6. In this position, in which the parking brake is always applied subsequent to the traction force exerted on the cable (1a) while maintaining the angular position of the mounting (3), of which the toothed gate (21) is engaged with the ratchet (22), it is perfectly possible to select and engage a gear (first or reverse, for instance); the disk is no longer coupled with the carriage; see FIG. 6.

Figure 7:
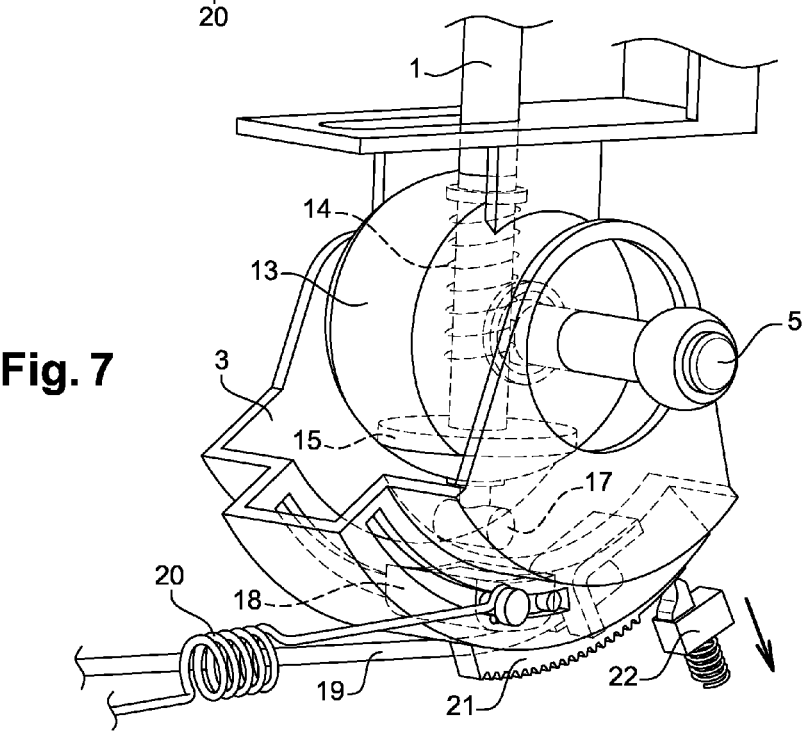
FIG. 7 shows the release of the parking brake after having retracted the ratchet.

To release the parking brake, it is sufficient to retract—by any known and appropriate means—the ratchet (22) and consequently release the cable (19), which is no longer subjected to a traction force (FIG. 7).

The advantages come to the fore clearly in the description; in particular, the following are emphasized and restated:

the dual function fulfilled by the control lever for, firstly, the engagement and selection of gears and, secondly, operation of the parking brake, with the possibility of using a lever equipped with a reverse gear locking trigger;

the possibility of engaging a gear in the parking brake operation position;

the ergonomics of the movement operated on the lever to implement each of these functions.

The invention claimed is:

1. A device for controlling a gearbox and a parking brake of a vehicle by means of a common control lever, the said lever having a trigger that is retractable against a travel limiter for engagement of a reverse gear; the lever is interlocked with a mechanism for switching from one position, allowing the engagement and selection of gears, to another position for applying the parking brake, with the possibility of selecting and engaging a gear; a lever base has a spherical body equipped with a multi-directional movement capability in a mounting, while being equipped for the engagement and selection of gears, characterized by the fact that the spherical body has, at its midpoint position, a disc mounted to rotate freely in a vertical plane, and traversed by an end of the lever, with the ability to slide against an elastic component; the said end has a temporary coupling device between the disc and the spherical body; the said device is able to interoperate, through force of pressure exerted on the lever, with a carriage controlled by a cable associated with the parking brake; the said carriage is movable within the mounting in which the spherical body is mounted, so as to cause, under an effect of angular movement of the lever, a movement of the said carriage and the said mounting, to exert a traction force on the cable and cause a system of teeth to engage with a retractable ratchet, in order to block the traction force on the cable, with the lever being returned to the position of coupling of the disc and a body via the elastic component, to allow the possible engagement of a gear.

2. The device according to claim 1, characterized by the fact that the temporary coupling device between the disc and the spherical body is composed of a hemispherical base with a circular flat span able to interoperate with a complementary imprint on the disc and the spherical body; the said temporary coupling device has a rod for coupling with the carriage.

3. The device according to claim 1, characterized by the fact that the mounting has two lateral flanges, and the carriage is mounted with a capability for angular movement in two arc-shaped openings existing in the lateral flanges on the mounting, which is shell-shaped.

4. The device according to claim 1, characterized by the fact that the carriage is acted-on by a return spring in a parking brake cable traction position.

5. The device according to claim 1, characterized by the fact that the mounting has two lateral flanges, and the teeth system is composed of a toothed gate protruding from one of the flanges of the mounting.

6. The device according to claim 1, characterized by the fact that the lever base is pivotally mounted in a plate in combination with coupling components connected to gear selection and engagement cables.

7. The device according to claim 1, characterized by the fact that a return spring of the carriage is coupled to a plate.

8. The device according to claim 1, characterized by the fact that the travel limiter protrudes from a plate, in order to interoperate with the trigger of the lever, which can be retracted against a second elastic component to escape the said travel limiter, corresponding to engagement of the reverse gear under an effect of angular tipping of the said lever.

9. The device according to claim 1, characterized by the fact that the ratchet is interlocked with means for being retracted and returned to a position of interoperation with the toothed gate of the mounting.

10. The device according to claim 1, characterized by the fact that the end of the lever is mounted with a capability for guided sliding within an open hole positioned vertically within the disc, being returned to the coupling position by a spring mounted in a coaxial recess of the said hole.

* * * * *